(12) United States Patent
Desy

(10) Patent No.: US 6,322,211 B1
(45) Date of Patent: Nov. 27, 2001

(54) TEMPLE ADJUSTMENT DEVICE

(75) Inventor: Raoul Desy, Fiskdale, MA (US)

(73) Assignee: Cabot Safety Intermediate Corporation, Southbridge, MA (US)

( * ) Notice: Subject to any disclaimer, the term of this patent is extended or adjusted under 35 U.S.C. 154(b) by 0 days.

(21) Appl. No.: 09/710,006

(22) Filed: Nov. 10, 2000

(51) Int. Cl.[7] .................................................... G02C 5/20
(52) U.S. Cl. ................................................................ 351/118
(58) Field of Search ...................................... 351/111, 116, 351/118, 119

(56) References Cited

U.S. PATENT DOCUMENTS

| | | | |
|---|---|---|---|
| 4,955,708 | * 9/1990 | Kahaney | 351/44 |
| 5,528,320 | 6/1996 | Specht et al. | 351/106 |
| 5,668,619 | * 9/1997 | Bolle | 351/118 |
| 5,796,461 | * 8/1998 | Stepan | 351/106 |
| 6,036,310 | 3/2000 | Moetteli | 351/118 |

* cited by examiner

*Primary Examiner*—Huy Mai
(74) *Attorney, Agent, or Firm*—Cantor Colburn LLP

(57) ABSTRACT

Eyewear having a temple body that provides for adjustment of the temple length. The temple adjustment housing has an interior cavity. Formed within the interior cavity is a longitudinal groove. The temple adjustment housing has at least one relief cut for receiving at least one projection located on the cylindrical temple tip. The temple tip is inserted into the circular opening and moved horizontally to adjust to the desired length. The temple tip is then rotated to lock into place the projections into the relief cuts.

19 Claims, 4 Drawing Sheets

TEMPLE ADJUSTMENT DEVICE

FIELD OF THE INVENTION

This invention relates generally to eyewear. More specifically, this invention relates to a temple adjustment device for eyewear.

BACKGROUND OF THE INVENTION

Traditional eyewear included fixed length temple bodies. Because such temple bodies were fixed in length, users were either forced to search for eyewear that included temple bodies of the proper length or order custom eyewear.

More recent advances in eyewear design have provided temple bodies manufactured to be adjustable to provide for a proper fit to each individual. For example, U.S. Pat. No. 5,528,320 to Specht et al. describes protective eyewear with temple bodies that may be adjusted in length. The temple bodies are adjusted by inserting a post (or temple tip) into a sleeve in which nubs, on the post, compress a slotted spring allowing guide tabs to enter the sleeve and move back and forth. The nubs may engage a series of ports to hold the temple body. Another is illustrated in U.S. Pat. No. 6,036,310 to Moetteli. This patent describes eyewear with a wrap-around temple portion and a temple portion adjustment mechanism. The temple portion adjustment mechanism is utilized by sliding a beam along an axis of the straight section of the wrap-around temple portion.

While these designs do allow for some temple adjustment, the temple tips are prone to slip from the desired position. Additionally, such adjustment mechanisms often become ineffective after short usage due to stripping of the temple tip.

There exists a need in the eyewear art to create a durable and adjustable temple body that is easily manipulated and securely locks into place.

SUMMARY OF THE INVENTION

The above-discussed and other problems and deficiencies of the prior art are overcome or alleviated by the temple adjustment device of the present invention.

In a preferred embodiment, a temple body comprises a temple tip having at least one projection and a temple adjustment housing. The temple adjustment housing includes an interior cavity for receiving the temple tip, a longitudinal groove extending at least partially along the interior cavity, and at least one relief cut contiguous with the longitudinal groove. The longitudinal groove and relief cuts are sized to receive at least one projection located on the temple tip.

Another preferred embodiment is a pair of eyewear comprising a lens having an endpiece and a temple hinge movably connected to the endpiece. The eyewear also comprises a temple adjustment housing with an interior cavity having a longitudinal groove and at least one relief cutout contiguous with the longitudinal groove. The eyewear comprises a temple tip having at least one projection, such that the temple tip is received in the interior cavity and a projection is received in the longitudinal groove and a relief cut.

In the preferred method, a method of adjusting the eyewear comprises providing eyewear that is comprised of a temple adjustment housing and a temple tip. The temple adjustment housing has an interior cavity, a longitudinal groove, and at least one relief cut contiguous with the longitudinal groove. The temple tip has at least one projection, in which the temple tip is received in the interior cavity and a projection is received in the longitudinal groove and a relief cut. In one position, the projection(s) on the temple tip slide longitudinally along the groove, thereby adjusting the overall length of the temple body. In a second rotated position, the projection(s) on the temple tip engage the tangential relief cut(s), thereby fixing the overall length of the temple body.

The above-discussed and other features and advantages of the present invention will be appreciated and understood by those skilled in the ail from the following detailed description and drawings.

BRIEF DESCRIPTION OF THE DRAWINGS

The present invention will now be described, by way of example only, with reference to the accompanying drawings, which are meant to be exemplary, not limiting, and wherein like elements are numbered alike in several Figures, in which.

DESCRIPTION OF THE PREFERRED EMBODIMENT

In accordance with the present invention, a temple body is provided for use in conjunction with eyewear.

Figure 1:
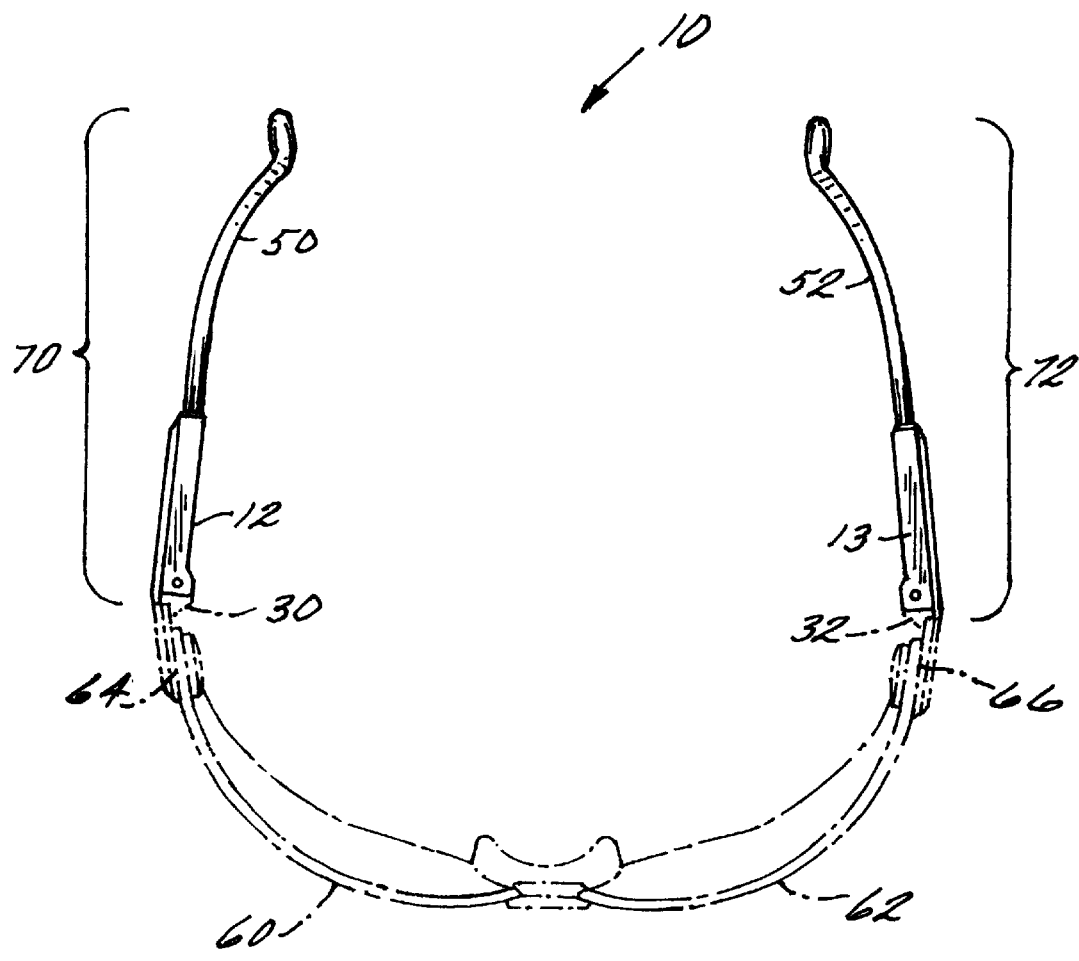
FIG. 1 is a top plan view of a pair of eyewear including the temple adjustment device, in accordance with the present invention.

Referring now to FIG. 1, eyewear in accordance with the present invention is shown generally at 10. Eyewear 10 includes a first and second lens 60, 62, the lenses including outer regions 64, 66. A first and second temple body 70, 72 attach to the first and second lenses 60, 62 at outer regions 64, 66. Alternatively, eyewear 10 may include a frame (not shown) including outer regions (not shown) which are substantially co-extensive with outer regions 64, 66 of lenses 60, 62, and which provide attachment for temple bodies 70, 72 thereon. In another embodiment, the first and second lens 60, 62 include a first and second endpiece 30, 32 which connect first and second temple body 70, 72 to the outer edge of first and second lens 60, 62, respectively. Preferably, the first and second temple adjustment housing (or temple housing) 12, 13 are pivotally connected to the first and second endpiece 30, 32 which allows the first and second temple body 70, 72 to be folded towards the first and second lens 60, 62, respectively. This reduces the size of the eyewear 10 for storage and reduces the likelihood that the temple bodies 70, 72 will be damaged.

Still referring to FIG. 1, the first and second temple body 70, 72 preferably include the first and second temple adjustment housing 12, 13 and first and second temple tip 50, 52, respectively. The temple adjustment housing 12, 13 receive the cylindrical first and second temple tip 50, 52, respectively. First and second temple tip 50, 52 are movably mounted to the first and second temple adjustment housing 12, 13 which allow the user to adjust the overall length of the temple body 70, 72, respectively.

Figure 2:
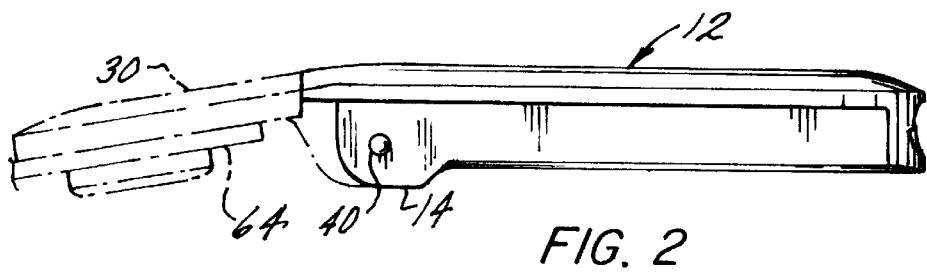
FIG. 2 is a top view of an exemplary temple adjustment housing, in accordance with the present invention.
Figure 3:
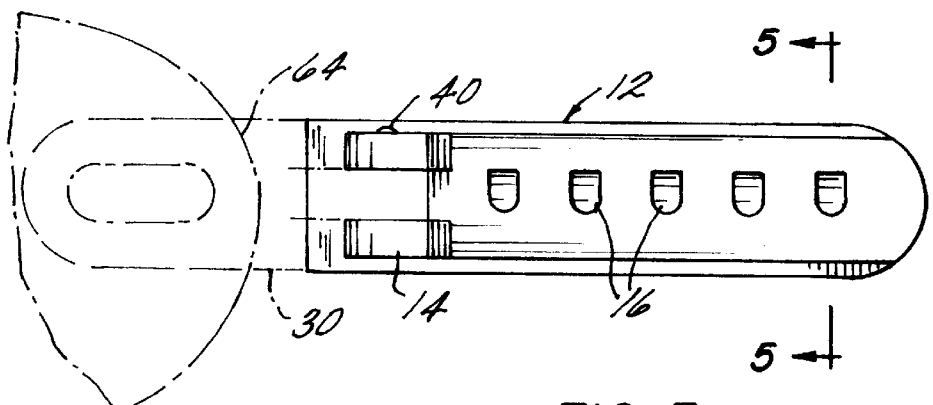
FIG. 3 is a side view of an exemplary temple adjustment housing, in accordance with the present invention.
Figure 4:
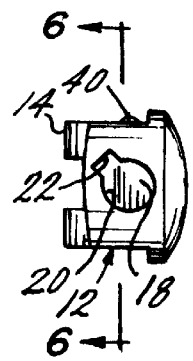
FIG. 4 is an end view illustrating the opening of the temple adjustment housing, in accordance with the present invention.

Referring now to FIGS. 2, 3, and 4, an exemplary temple adjustment housing 12 includes a temple hinge 14 that is located on, or is connected to, the temple adjustment housing 12. The temple adjustment housing 12 has an interior cavity (or cavity) 18 for receiving a temple tip 50 (shown in FIG. 7). Relief cuts 16 are formed in one side of the interior cavity 18 for engaging the temple tip 50 (shown in FIG. 7). Although a series of relief cuts 16 is illustrated, at least one relief cut may be utilized in the present invention. Relief cuts 16 are formed to the inside surface of the temple adjustment housing 12. The series of relief cuts 16 may be of any shape, although a rectangular shape is illustrated. A pin 40 can be used to pivotally mount the temple hinge 14 to a pair of eyewear.

Figure 5:
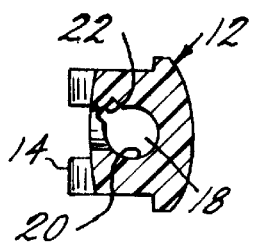
FIG. 5 is a side cross sectional view of an exemplary temple adjustment housing, in accordance with the present invention.
Figure 6:
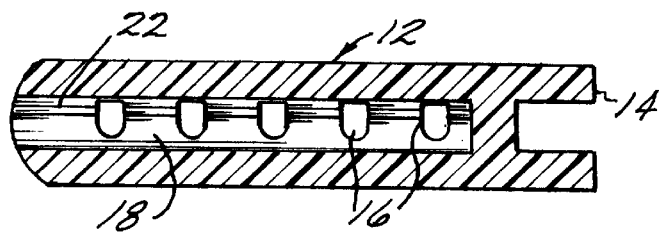
FIG. 6 is an end cross sectional view illustrating the opening of the temple adjustment housing, in accordance with the present invention.

Referring still to FIG. 4, an end view of the temple adjustment housing 12 is illustrated. Referring also to FIGS. 5 and 6, a cross sectional view of the temple adjustment housing 12 is illustrated. The interior cavity 18 has a generally circular opening 20. The interior cavity 18 is of a prescribed depth in order to receive and engage the temple tip 50. Formed in the interior cavity 18 is a longitudinal groove (or groove) or slot 22, which extends the length of the interior cavity 18. The longitudinal groove 22 is configurous with the relief cuts. The longitudinal groove 22 may be located on the vertical centerline or at a prescribed angle from the vertical centerline of the temple tip 50 (shown in FIG. 7).

Figure 7:
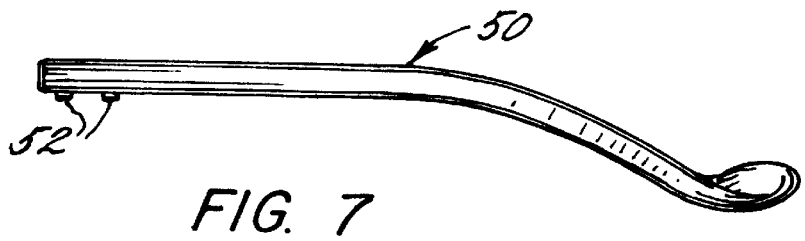
FIG. 7 is a top view of an exemplary temple tip in accordance with the present invention.
Figure 9:
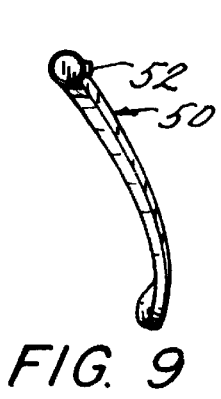
FIG. 9 is an end view of an exemplary temple tip in accordance with the present invention.
Figure 8:
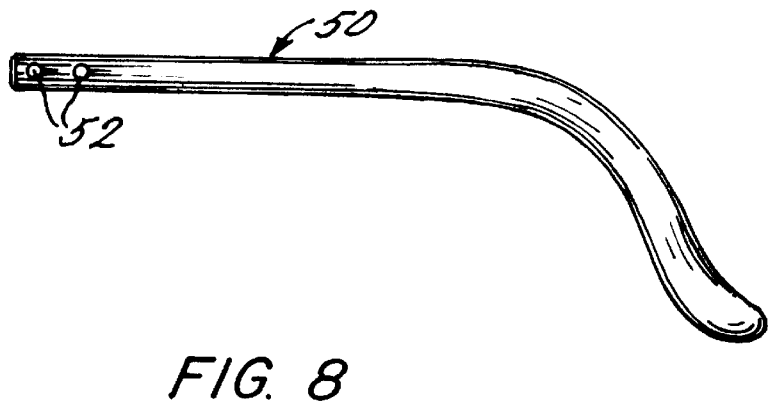
FIG. 8 is a side view of an exemplary temple tip in accordance with the present invention.

Referring now to FIGS. 7, 8, and 9, views of the temple tip 50 are illustrated. At least one projection 52 is formed on the temple tip 50. The projections(s) 52 are configured to slide within the longitudinal groove 22 and to lock into the relief cuts 16. The projection(s) 52 can be located on the horizontal centerline of the temple tip 50. The projection(s) 52 may be of any shape, although a circular shape is illustrated. The projection(s) 52 may be located such that the first projection is near the end of the temple tip 50 and the second projection is about 5 millimeters away from the first on the same centerline. An end view of an exemplary temple tip is provided in FIG. 9 to illustrate the temple tip 50 and one projection 52.

Figure 10:
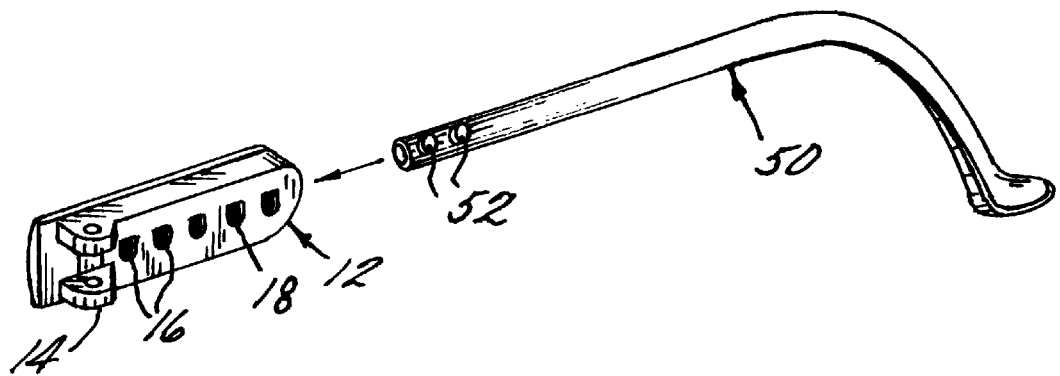
FIG. 10 is an illustration of the temple tip and the temple adjustment housing, in accordance with the present invention.
Figure 11:
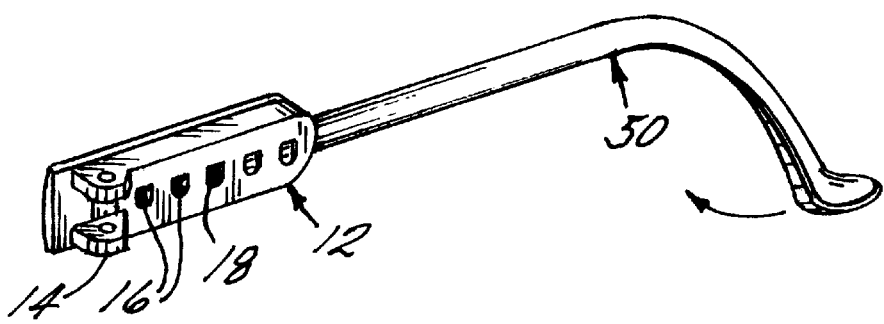
FIG. 11 is an illustration of the temple tip being inserted into the temple adjustment housing, in accordance with the present invention.
Figure 12:
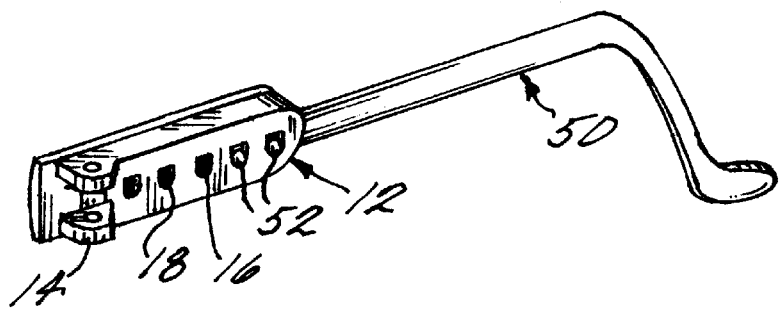
FIG. 12 is an illustration of the temple tip being locked into the temple adjustment housing, in accordance with the present invention.

FIGS. 10, 11, and 12 illustrate a preferred method of use, wherein the temple tip 50 is inserted into the interior cavity 18 through the opening 20. By fixing or holding the temple adjustment housing 12, the temple tip 50 can move relative to the temple adjustment housing 12. The user slides the temple tip 50 within the interior cavity 18 such that the projections 52 are inserted into the longitudinal groove that extends the length of the interior cavity 18. The projections 52 are moved along in the longitudinal groove until the temple tip 50 is at the desired length. At this point, the temple tip 50 is rotated towards the outside of the eyewear in which the relief cuts 16 engage the projections 52, locking the temple tip 50 to the desired length. To change the length again, the temple tip 50 is rotated towards the center of the eyewear to unlock the projections 52 from the relief cuts 16 and can be moved to another position.

The fit between the projections and the relief cuts prevents the temple tip from freely sliding within the temple adjustment housing. By rotating the temple tip to lock in the projections into the series of relief cuts, this prevents the temple tip from becoming removed from the temple adjustment housing.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A temple body comprising:
   a temple tip having at least one projection; and
   a temple housing, said temple housing including a cavity, said cavity receiving said temple tip, a groove extending at least partially along said cavity, and at least one relief cut contiguous with said groove, said groove being sized to receive said at least one projection of said temple tip and said at least one relief cut being sized to receive said at least one projection of said temple tip.

2. The temple body of claim 1, wherein said groove is located on the vertical centerline of said temple tip.

3. The temple body of claim 1, wherein said groove is located at a prescribed angle from the vertical centerline of said temple tip.

4. The temple body of claim 1, wherein said at least one projection is located on the horizontal centerline.

5. The temple body of claim 4, wherein said at least one projection is located near the end of said temple tip and at least another projection is located about 5 millimeters from said at least one projection on the same centerline.

6. Eyewear comprising:
   a lens having an endpiece
   a temple hinge movably connected to said endpiece;
   a temple housing, having a cavity with a longitudinal groove and at least one relief cut contiguous with said groove, said temple housing being connected to said temple hinge; and
   a temple tip having at least one projection, said temple tip receivable in said cavity and said at least one projection receivable in said longitudinal groove and said at least one projection receivable in said at least one relief cut.

7. The eyewear of claim 6, wherein said groove is located on the vertical centerline of said temple tip.

8. The eyewear of claim 6, wherein said groove is located at a prescribed angle from the vertical centerline of said temple tip.

9. The eyewear of claim 6, wherein said at least one projection is located on the horizontal centerline.

10. The eyewear of claim 6, wherein said at least one projection is located near the end of said temple tip and at least another projection is located about 5 millimeters from said at least one projection on the same centerline.

11. The eyewear of claim 6, wherein said temple tip is rotated toward the outside of said eyewear to lock said at least one projection into said at least one relief cut.

12. The eyewear of claim 6, wherein said temple tip is rotated toward the inside of said eyewear to unlock said at least one projection from said at least one relief cut.

13. The method of adjusting eyewear comprising:

fixing said eyewear relative to a temple tip, said eyewear including a temple housing having a cavity, a longitudinal groove, and at least one relief cut contiguous with said groove, and said temple tip having at least one projection, said temple tip being receivable in said cavity and said at least one projection being receivable in said longitudinal groove and said at least one projection being receivable in said at least one relief cut; and adjusting said temple tip to various lengths and rotating said temple tip to lock into place said at least one projection into said at least one relief cut.

14. The method of claim 13, wherein said adjusting said temple tip is locked into place by rotating said temple tip towards the outside of said yewear which locks said at least one projection into said at least one relief cut.

15. The method of claim 13, wherein said adjusting said temple tip is unlocked by rotating said temple tip towards the inside of said eyewear which unlocks said at least one projection from said at least one relief cut.

16. The method of claim 13, wherein said groove is located on the vertical centerline of said temple tip.

17. The method of claim 13, wherein said groove is located at a prescribed angle from the vertical centerline of said temple tip.

18. The method of claim 13, wherein said at least one projection is located on the horizontal centerline.

19. The method of claim 13, wherein said at least one projection is located near the end of said temple tip and at least another projection is located about 5 millimeters from said at least one projection on the same centerline.

* * * * *